United States Patent [19]

Daniels et al.

[11] 4,111,287
[45] Sep. 5, 1978

[54] SHIFT MODULATING CONTROL ACCUMULATOR

[75] Inventors: Jerry Lee Daniels, Mossville; Albert Lloyd Woody, Peoria, both of Ill.

[73] Assignee: Caterpillar Tractor Co., Peoria, Ill.

[21] Appl. No.: 763,738

[22] Filed: Jan. 28, 1977

[51] Int. Cl.² .............................................. F16D 39/00
[52] U.S. Cl. ................................. 192/3.27; 192/3.33; 192/109 F
[58] Field of Search ................... 192/3.27, 3.33, 87.19, 192/109 F; 74/732, 733

[56] References Cited

U.S. PATENT DOCUMENTS

| 3,224,537 | 12/1965 | Hilpert | 192/3.3 X |
| 3,348,644 | 10/1967 | Hilpert | 192/87.19 X |
| 3,621,955 | 11/1971 | Black et al. | 192/3.33 X |
| 3,820,417 | 6/1974 | Allen et al. | 192/3.33 X |
| 3,822,770 | 7/1974 | Golan | 192/3.33 X |
| 3,991,865 | 11/1976 | Komatsu | 192/109 F |

Primary Examiner—James F. Coan
Attorney, Agent, or Firm—Wegner, Stellman, McCord, Wiles & Wood

[57] ABSTRACT

A hydraulic transmission control circuit for modulating the controls of a loader includes an accumulator connected to the reverse speed clutch. The accumulator, which has a free sliding piston, has one end communicating with the reverse speed clutch, while the other end of the accumulator has an inlet communicating with the discharge port of a torque converter for charging the accumulator and an outlet communicating with a fluid reservoir through a check valve. A directional control valve may be utilized to selectively connect the accumulator with the reverse speed clutch or a forward speed clutch for respective loader or bulldozer applications.

7 Claims, 2 Drawing Figures

SHIFT MODULATING CONTROL ACCUMULATOR

BACKGROUND OF THE INVENTION

This invention relates generally to a hydraulic vehicle transmission control system for selectively actuating a hydraulically-operated clutch and, more particularly, to means for dampening or modulating the directional controls of the vehicle.

Heavy-duty earthmoving vehicles, such as loaders or bulldozers, employ extensive hydraulic circuitry to obtain desired operational control and achieve effective performance. Sophisticated circuits including specially designed pressure modulating and directional control valves and pressure accumulators are often integrated into these hydraulic circuits to obtain specific functions, desired responses and operating characteristics so as to achieve maximum performance of the vehicle and the loader mechanism.

For example, pressure accumulators can be introduced to obtain the necessary response or pressure displacement required to engage clutch plates, brake bands or other related control means and hydraulic control valves can be used in combination with a spring-biased pressure regulator to obtain dual modulation for a transmission control system.

In the past, when a vehicle was used as a bulldozer, it was customary to integrate a spring-loaded accumulator into the first forward speed control circuit to cushion transmission clutch loads. Pressure fluid would be diverted into the high pressure end of the accumulator to shift the accumulator piston after forcefully overcoming the biasing spring load. Through the sequential shifting of the piston, delayed buildup of fluid pressure and driving engagement of transmission clutches was accomplished. Thus, engagement and shock loads generated by rapid transmission clutch engagements under heavy loads were effectively modulated.

Presently, when the forwardly disposed bucket of a loader is elevated and filled with heavy material, rapid engagement of the reverse speed clutches and quick acceleration to a reverse drive can cause the rear of the vehicle to raise up and pivot about the front idler even when the vehicle is heavily counterbalanced. It therefore becomes highly desirable to provide within the control circuitry a means for regulating the engagement of the various drive clutches so that the rate of acceleration can be regulated and kept within safe limits so as to greatly inhibit the rocking of the vehicle and reduce stress on components.

If an accumulator were connected to the reverse speed directional port of the transmission control valve to cushion the engagement of the reverse speed clutch, it would maintain optimal vehicle stability when and if sudden engagement of the reverse speed clutch were effected with the bucket elevated and fully loaded. It is evident then that a relatively simple accumulator incorporated into the transmission control circuits making extended and improved use of the vehicle possible would be advantageous.

SUMMARY OF THE INVENTION

The present invention is directed to overcoming one or more of the problems as set forth above.

According to the present invention, an accumulator is incorporated into a hydraulic transmission control circuit for a loader, the accumulator being operatively connected to the reverse speed clutch.

The hydraulic transmission control circuit includes a source of fluid under pressure, a fluid reservoir, a transmission control valve communicating with the source of fluid and having an adjustable element for selectively directing fluid under pressure to outlet passages for delivery to hydraulically-operated clutches, and a hydraulically-operated torque converter having an intake port communicating with another outlet passage of the transmission control valve and a discharge port, the transmission control valve controlling fluid flow to the torque converter during speed changes.

The accumulator employed herein has a housing with a bore, a free sliding piston disposed within the bore, a port at one end of the bore communicating with the directional passage of the transmission control valve connected to the reverse speed clutch, an inlet port and an outlet port at the other end of the bore, the inlet port communicating with the discharge port of the torque converter, the outlet port communicating with a fluid reservoir, and a check valve positioned between the outlet port of the accumulator and the fluid reservoir. When the transmission control valve is operated to engage the reverse speed clutch, by directing hydraulic fluid to the directional passage connected thereto, fluid fills the end of the accumulator and moves the piston toward the other end thereby effecting a delay in clutch engagement. When the transmission control valve is operated to disengage the reverse speed clutch, hydraulic fluid fills the other end of the accumulator and drives the piston toward the one end to recharge the accumulator. The check valve permits fluid flow to the reservoir whenever a predetermined pressure is achieved at the other end of the bore.

In a preferred embodiment, a directional control valve is positioned between the transmission control valve and the accumulator and is operative to a first position for loader applications to provide communication between the accumulator and the outlet passage for the reverse speed clutch and to a second position for bulldozer applications providing communication between the accumulator and the outlet passage for the first forward speed clutch.

DESCRIPTION OF THE PREFERRED EMBODIMENT

Figure 1:
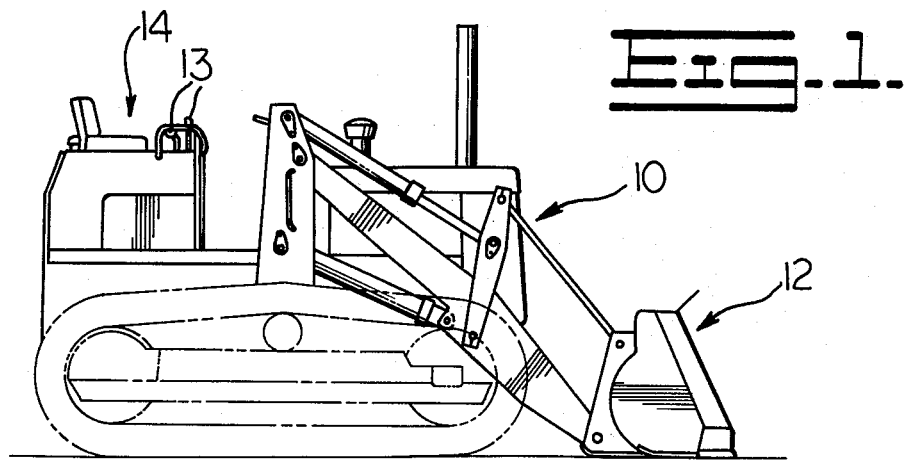
FIG. 1 is a side elevational view of a crawler-type loader in which the hydraulic control circuit may be advantageously employed.

Referring to FIG. 1, a crawler-type tractor, generally designated 10, is equipped with a front mounted loader linkage and bucket 12 and has suitable controls 13 for operating the tractor from an operator's station 14.

Figure 2:
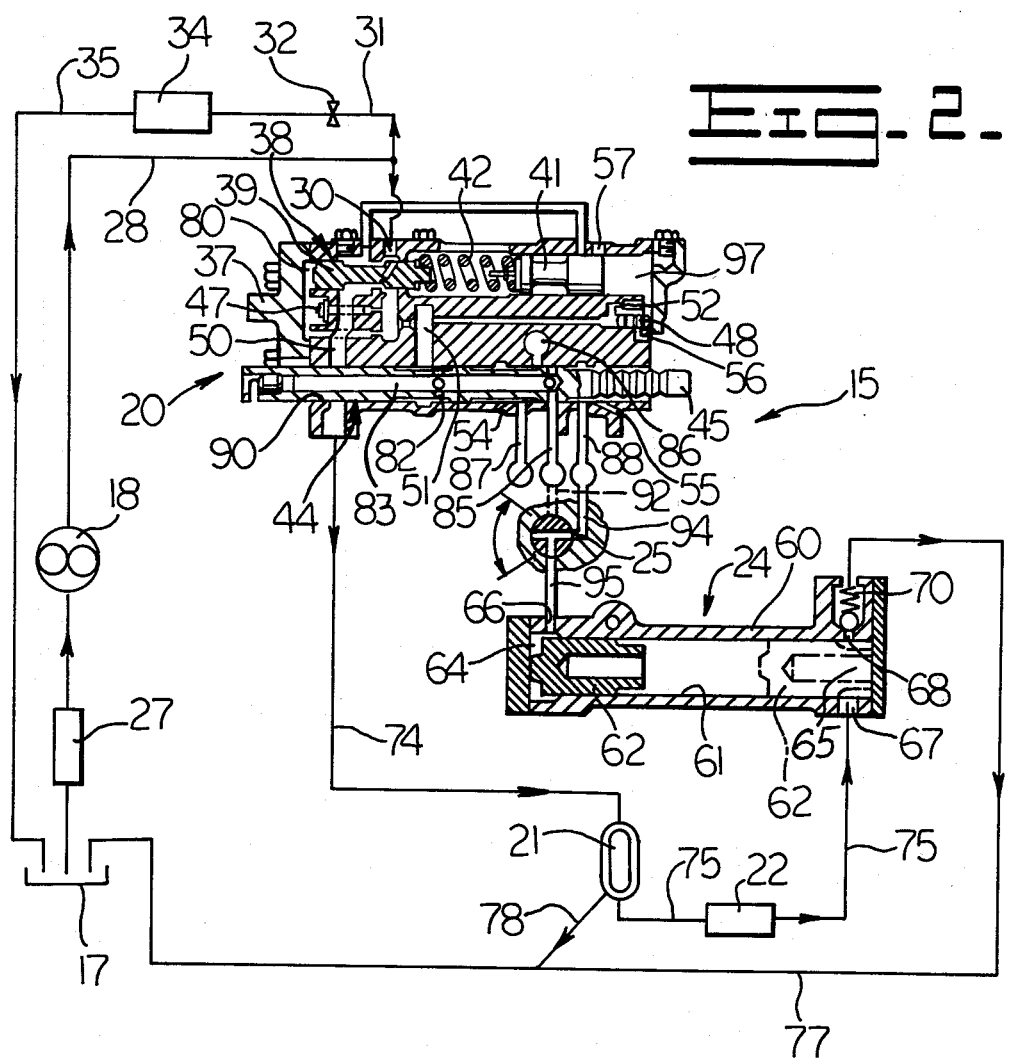
FIG. 2 is a schematic diagram of a hydraulic circuit used for supply and operation of a transmission and a torque converter in which a transmission control valve for selective engagement of a clutch and a piston accumulator is incorporated in accordance with the invention.

Referring to FIG. 2, a portion of the vehicle hydraulic control system, generally designated 15, broadly includes a reservoir 17 for hydraulic fluid, such as oil, a pump 18 for withdrawing oil from the reservoir 17, a transmission directional and pressure modulating valve, generally designated 20, a torque converter 21, an oil filter and cooler 22, a piston-type accumulator 24 for effecting a smoother shift between selected speeds, and a three-way, two-position valve 25.

In general, power from the tractor engine (not shown) is delivered directly to the torque converter 21, which, in turn, drives the input shaft of the tractor transmission (not shown). Four hydraulically-actuated clutches (not shown) operating within the transmission give three forward speeds and one reverse speed through manual selection. Only one clutch is engaged for each speed, the clutches being selectively engaged during change of speed or direction.

The pump 18 withdraws oil from the reservoir through an oil screen 27 and delivers oil under pressure to a line 28 which, in turn, is connected to the intake port 30 of the transmission control valve 20. A line 31 is teed into the line 28 so that a portion of the oil in the line 28 is directed through an orifice 32 to other components such as steering clutches and brake controls, designated 34. Oil expended from these other components is returned to the reservoir 17 via tank line 35.

The transmission control valve 20 includes within a housing 37: a modulating relief valve 38 having a spool 39 for maintaining system pressure below 300 p.s.i.; a load piston 41 for controlling modulation of system pressure for the modulating relief valve 38; one or more springs 42 between the spool 39 and the load piston 41; a speed selection control valve 44 having a spool 45 for controlling the flow of oil to and from selected clutches and the flow of oil to the accumulator 24; check valves 47 and 48 for opening return passages and relieving pressure from behind the spool 39 and the load piston 41; internal supply passages, two of which are designated 50 and 51; and a modulating orifice 52. Drain ports 54,55,56 and 57 are appropriately connected by means not illustrated to the reservoir 17.

The accumulator 24 includes a housing 60 with a longitudinally extending bore 61 therein and a free sliding piston 62 disposed within the bore 61 to move between the opposite ends 64 and 65 thereof. An inlet port 66 provides communication with the bore 61 at the left end 64, while an inlet port 67 and an outlet port 68 provide communication with the bore 61 at the right end 65. A check valve 70 providing low pressure relief is located at the outlet port 68.

In this particular hydraulic system, the pump 18 under the influence of the various valves provides fluid pressure ranging approximately from 10 p.s.i. up to 300 p.s.i. to achieve desired control functions. Through suitable internal ports and supply passages, including passage 50, within the transmission control valve 20 and under the influence of the spool 39, oil pressurized to approximately 100 p.s.i. is directed through a line 74 to the intake port of the torque converter 21 and eventually exits through a discharge port into a line 75 and is directed sequentially through the oil filter 22 to the low pressure end 65 of the accumulator 24 and out through the low pressure relief valve 70 into a tank line 77. A second optional drain line 78, which is also connected to the tank line 77, serves to scavenge leakage from a dry compartment.

Shifting of the spool 39 to the right under pressure in reaction chamber 80 against the force of the load piston 41 and the springs 42 acts to maintain oil pressure at approximately 300 p.s.i. in supply passage 51 and the speed selector valve 44. Through annular relief and radial ports 82 in the spool 45, oil under pressure enters a central bore 83 in the spool 45 from which it passes on to either first, second, and third forward speed or reverse speed direction ports 85,86,87 and 88, respectively, (and to the supply ports of the respective clutches connected thereto) depending on the position of the spool 45 within its associated bore 90. Selective manipulation of the spool 45 is effected by a mechanical linkage (not shown) which attaches to the left end of the spool 45. All clutch supply ports not pressurized by positioning of the spool 45 are open to tank via drains 54 and 55 and, therefore, are at substantially 0 p.s.i.

As shown in FIG. 2, the accumulator 24 has been modified to differ from those in the prior art discussed above by eliminating the load spring and by providing the low pressure charging port 67 at the right end 65 of the housing 60. Oil at pressures ranging approximately from 10 to 30 p.s.i. delivered through the port 67 is utilized to sequentially return the piston 62 from a position shown in phantom to a charged position shown in solid lines.

When the tractor 10 is utilized in a loader application, the valve 25 is positioned to provide communication between the reverse clutch port 88 and the accumulator inlet port 66 through a supply line 94 and the accumulator supply line 95.

When the spool 45 is shifted to drive the tractor 10 in reverse, communication is achieved between the reverse clutch port 88 and the internal supply passage 51 so that oil under pressure is delivered to the reverse speed clutch and to the high pressure inlet port 66 of the accumulator 24. During filling, the pressure within the system 15 decreases so that the force of the springs 42 moves the spool 39 all the way to the left and the load piston 41 all the way to the right. When the spool 39 is moved to the left, oil flow to the torque converter 21 is stopped.

As the end 64 of the accumulator fills, the piston 62 shifts rightwardly to its phantom position thereby affording a predetermined delay in effective engagement of the reverse speed clutch. The relief valve 70 has volumetric capacity to provide fast dumping of the oil at the end 65. This desirably maintains low pressure to assure adequate lubrication of various components but minimum back pressure in the transmission control system.

When the accumulator 24 is filled, the reverse speed clutch is energized. When the reverse speed clutch and the accumulator 24 are both filled, pressure in the system goes up. When oil pressure overcomes the force of the springs 42, the spool 39 is urged rightwardly so that oil is again directed to the torque converter 21. The check valve 48 closes the drain 56 behind the load piston 41 so that oil does not return to the reservoir 17. When the system pressure goes even higher, the load piston 41 moves leftwardly and the force of the springs 42 acting on the spool 39 is higher. Pressure thereby increases gradually to achieve modulation.

When the reverse speed clutch port 88 is opened to tank by shifting of the spool 45 to another position, oil under pressure flowing through the line 75 charges the accumulator 24 by filling the right end 65 and driving the piston 62 toward the left end 64, oil at the left end 64 being forced to the reservoir 17 via the drain 54 or 55.

When the spool 45 is shifted to a neutral position, all of the clutches are opened to the reservoir 17 via the drain 54 or 55. Oil from the modulating relief valve 38 goes to the cavity 97 behind the load piston 41 and to the spool 45. The load piston 41 is shifted leftwardly so that the cavity 97 is connected to the drain 57. The check valve 48 is all the way to the right and the check valve 47 is all the way to the left. The oil in the system 15 will thereby be modulated up to a maximum of 300 p.s.i.

When the speed selection valve 44 is shifted to a first forward speed position as seen in FIG. 2, the spool 45 will be moved so that the first forward speed clutch will be connected to the supply passage 51 via port 85 and filled with oil. Operation will be similar to that described above with respect to reverse, except that the accumulator 24 will not be functional.

If the tractor 10 is to be utilized as a bulldozer, the valve 25 is positioned to provide communication between the first forward speed port 85 and supply lines 92 and 95 to provide modulation during shifting to first speed forward. Usually, the valve 25 would be preassembled and have only limited access. At assembly, the valve 25 would be connected to the first forward speed clutch or the reverse speed clutch for respective bulldozer or loader operation and normally would not be changed during the life of the tractor. Use of such a selectively positioned valve would serve principally to facilitate assembly when the transmissions are being prepared respectively for bulldozer or loader applications.

Interchangeable use of accumulator 24 for bulldozer and loader applications serves effectively to regulate vehicle speed and directional changes thereby contributing toward improved stability, productive capacity and/or lower levels of stress applied to various components. Selective use of first forward or reverse speed clutch charging lines is required to keep the accumulator functionally effective. If work fluid were diverted simultaneously from both first forward speed and reverse speed clutches, there could be no sequential charging and/or dumping of the accumulator because most directional and speed changes are made quite rapidly.

The embodiments of the invention in which an exclusive property or privilege is claimed are defined as follows:

1. A hydraulic transmission control circuit for a loader for selectively actuating a hydraulically-operated clutch comprising:
    a source of fluid under pressure;
    a fluid reservoir;
    transmission control valve means communicating with the source of fluid and having an adjustable element for selectively directing fluid under pressure to outlet passages for delivery to hydraulically-operated clutches including a forward speed clutch and a reverse speed clutch;
    a hydraullically-operated torque converter having an intake port communicating with another outlet passage of said transmission control valve means and a discharge port, said transmission control valve means controlling fluid flow to said torque converter during speed changes; and
    an accumulator with a hydraulically-charged, free-sliding piston and having a port at one end communicating with the intake of the reverse speed clutch and a port at the opposite end communicating with the fluid reservoir so that fluid at the opposite end is vented to the fluid reservoir whenever said piston is moved toward said opposite end, said one end of said accumulator filling with fluid when said transmission control valve means is operated to direct fluid to the reverse speed clutch so that operation of the reverse speed clutch is delayed until said one end is filled thereby modulating engagement of the reverse speed clutch.

2. The hydraulic transmission control circuit of claim 1 further including a directional control valve between said transmission control valve means and said accumulator operable to a first position providing communication between said accumulator and the outlet passage for the reverse speed clutch and a second position providing communication between said accumulator and the outlet passage for the forward speed clutch.

3. In a hydraulic transmission control circuit for selectively actuating a hydraulically-operated clutch including a source of fluid under pressure, a fluid reservoir, ttransmission control valve means communicating with the source of fluid and having an adjustable element for selectively directing fluid under pressure to outlet passages for delivery to hydraulically-operated clutches, and a hydraulically-operated torque converter having an intake port communicating with another outlet passage of the transmission control valve means and a discharge port, the transmission control valve controlling fluid flow to the torque converter during speed changes, the improvement comprising:
    an accumulator having a housing with a bore therein, a free sliding piston disposed within said bore movable between the opposite ends thereof, one end of said bore having a port communicating with an outlet passage of the transmission control valve means connected to one of the clutches, the other end of said bore having an inlet port communicating with the discharge port of the torque converter and having an outlet port communicating with the fluid reservoir, and a check valve between said outlet port and the fluid reservoir, whereby fluid fills said one end of said accumulator and moves said piston toward said other end whenever the transmission control valve means is operated to engage said one clutch and whereby fluid fills said other end and moves said piston toward said one end to charge said accumulator whenever the transmission control valve means is operated to disengage said one clutch, said check valve permitting fluid flow from said other end of said accumulator to the fluid reservoir whenever a predetermined pressure is achieved at said other end of said bore.

4. A tractor utilizing the hydraulic transmission control circuit of claim 3 and having a forward speed clutch and a reverse speed clutch, said port at said one end of said accumulator being connected to the outlet passage of the transmission control valve means connected to said reverse speed clutch so that the rate of reverse acceleration is regulated.

5. A tractor utilizing the hydraulic transmission control circuit of claim 3 and having an forward speed clutch and an reverse speed clutch, and further including a directional control valve between the transmission control valve means and said accumulator operable to a first position providing communication between said accumulator and the outlet passage for the reverse speed clutch and a second position providing communication between said accumulator and the outlet passage for the forward speed clutch.

6. The hydraulic transmission control circuit of claim 3 further including a second drain line connecting the torque converter to the fluid reservoir for scavenging the torque converter.

7. The hydraulic transmission control circuit of claim 3 wherein the transmission control valve means includes means for directing fluid under pressure to one of the outlet passages and its associated clutch and venting the remainder of the outlet passages and their associated clutches to the fluid reservoir.

* * * * *